(12) United States Patent
Ishii

(10) Patent No.: US 8,611,738 B2
(45) Date of Patent: Dec. 17, 2013

(54) IMAGE CAPTURING APPARATUS

(75) Inventor: Hirokazu Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 12/879,487

(22) Filed: Sep. 10, 2010

(65) Prior Publication Data

US 2011/0085785 A1 Apr. 14, 2011

(30) Foreign Application Priority Data

Oct. 8, 2009 (JP) ................................. 2009-234645

(51) Int. Cl.
*G03B 13/00* (2006.01)

(52) U.S. Cl.
USPC ........................................ 396/124; 348/349

(58) Field of Classification Search
USPC .................... 396/104, 124; 348/349
See application file for complete search history.

(56) References Cited

U.S. PATENT DOCUMENTS

| 6,829,008 | B1 | 12/2004 | Kondo et al. | |
|---|---|---|---|---|
| 2007/0154200 | A1* | 7/2007 | Utagawa et al. | 396/111 |
| 2007/0237511 | A1* | 10/2007 | Kusaka | 396/111 |
| 2009/0278966 | A1* | 11/2009 | Kusaka | 348/294 |
| 2010/0045849 | A1* | 2/2010 | Yamasaki | 348/349 |
| 2010/0214452 | A1* | 8/2010 | Kawarada | 348/255 |
| 2011/0169997 | A1* | 7/2011 | Nagano et al. | 348/340 |

FOREIGN PATENT DOCUMENTS

| JP | 2000-156823 A | 6/2000 |
|---|---|---|
| JP | 2007-279312 A | 10/2007 |

\* cited by examiner

*Primary Examiner* — Christopher Mahoney
*Assistant Examiner* — Fang-Chi Chang
(74) *Attorney, Agent, or Firm* — Fitzpatrick, Cella, Harper & Scinto

(57) ABSTRACT

An image capturing apparatus includes an image sensor having a focus detection pixel group including a plurality of focus detection pixels that receive light passing through a part of a pupil area of an imaging lens for forming an object image and an image forming pixel group including a plurality of image forming pixels that receive light passing through the whole of the pupil area of the imaging lens; and an image processing unit that generates an image signal corresponding to the position of each of the focus detection pixels by using at least either of a signal of the focus detection pixel at the position and signals of neighboring image forming pixels of the focus detection pixel at the position, depending on the size of an aperture of the focus detection pixels.

5 Claims, 12 Drawing Sheets

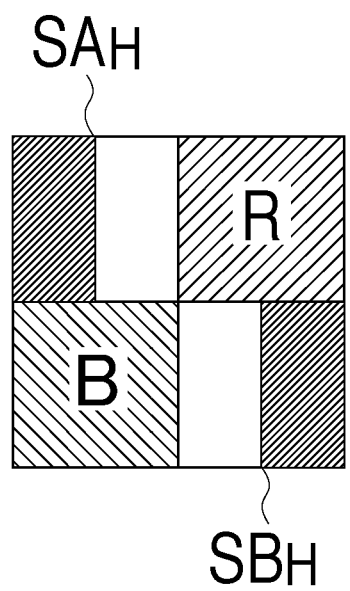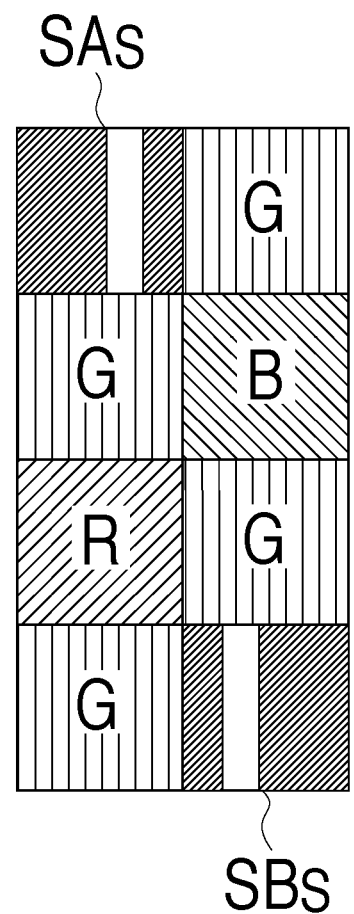
F I G. 6A          F I G. 6B

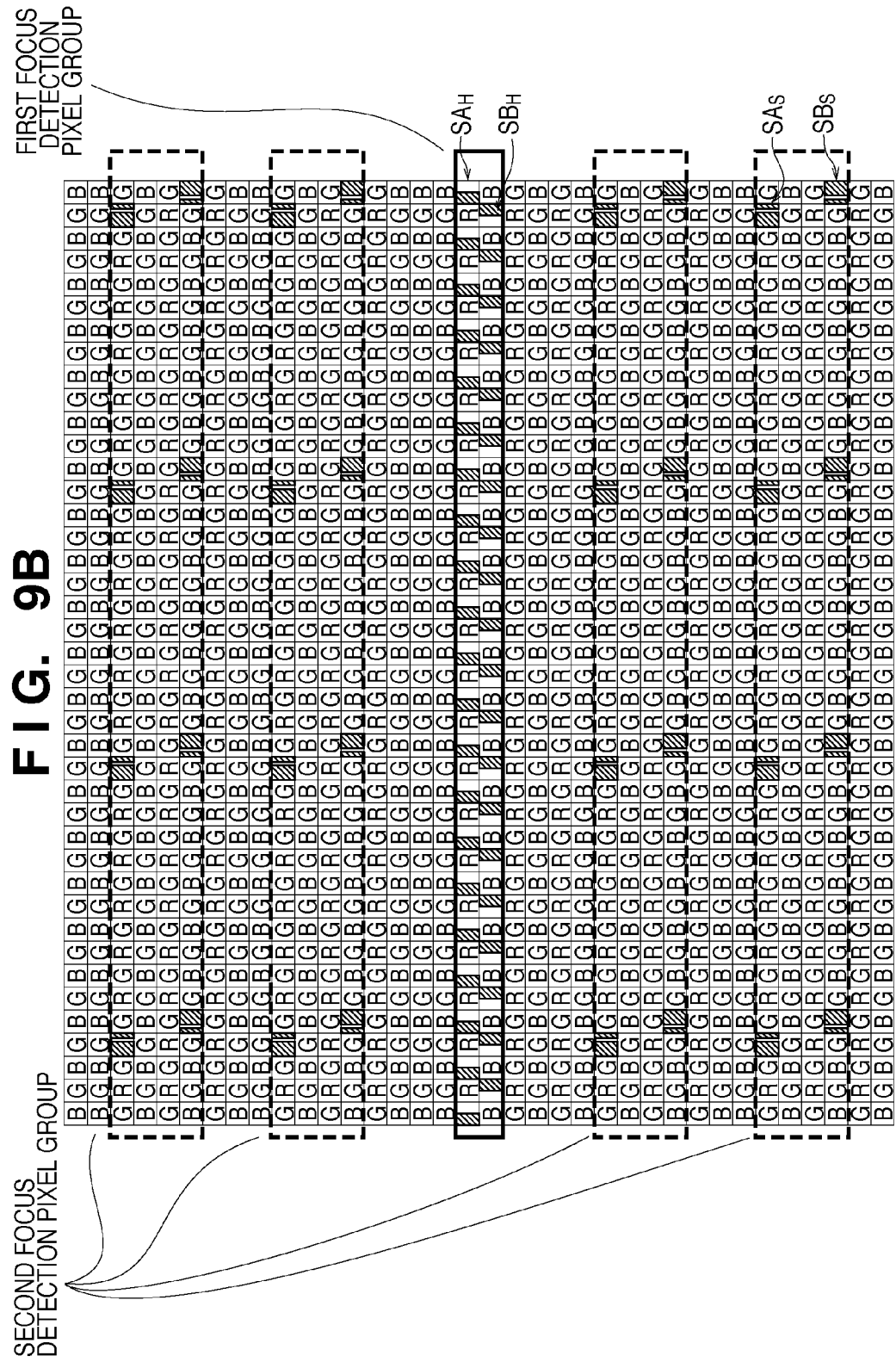

IMAGE CAPTURING APPARATUS

BACKGROUND OF THE INVENTION

1. Field of the Invention

The present invention relates to an image capturing apparatus such as a digital camera or a video camera, and particularly relates to an image capturing apparatus that performs focus detection based on the output from an image sensor.

2. Description of the Related Art

Technology for eliminating the need for a dedicated AF sensor and realizing high-speed phase difference AF on an image sensing plane by providing a phase difference detection function to an image sensor has been proposed. For example, according to Japanese Patent Laid-Open No. 2000-156823, in part of light receiving elements (pixels) on an image sensor, a sensitive area of a light receiving unit is positioned eccentrically with respect to an optical axis of an on-chip microlens, thereby providing a pupil division function. These pixels are used as focus detection pixels and disposed among a group of image forming pixels at predetermined intervals in order to perform phase difference type focus detection. Here, there are differences in light receiving characteristics between the focus detection pixels and dedicated image forming pixels. For example, the focus detection pixels have a smaller light receiving unit area than the dedicated image forming pixels, or the position of the center of gravity of a light receiving area of the focus detection pixels is shifted from the optical axis of the on-chip microlens. Thus, at locations where the focus detection pixels are disposed, image information is partially lost, and image signals are therefore generated by performing an interpolation operation based on information about dedicated image forming pixels in the neighborhood of those focus detection pixels.

Here, if the focus detection pixels are disposed at a sparse density, image quality degradation due to the above-described pixel defect can be alleviated, but on the other hand, focus detection image sampling characteristics deteriorate, resulting in a decrease in focus detection performance. That is to say, in this technical field, the manner in which the focus detection pixels are disposed is important in order to achieve both maintenance of focus detection performance and prevention of image quality degradation.

According to a technique disclosed in Japanese Patent Laid-Open No. 2007-279312, a first focus detection pixel group and a second focus detection pixel group are provided, wherein the first focus detection pixel group having a short image detection pitch performs high-precision focus detection and the second focus detection pixel group whose image detection pitch has been increased by narrowing a light receiving area of focus detection pixels performs detection of a large defocus amount, thereby achieving both high-precision focus detection and detection of a large defocus amount.

However, the above-described known techniques suffer the following problems. According to the technique disclosed in Japanese Patent Laid-Open No. 2007-279312, first focus detection pixels are disposed densely in order to detect the focus status in the vicinity of an in-focus position with high precision. Also, image signals of the focus detection pixels are generated by interpolation processing using output signals of dedicated image forming pixels in the neighborhood of the focus detection pixels. However, in the case of receiving light from an object having a high spatial frequency and other cases, the continuity of an image in the position of a focus detection pixel is less than that of images in the positions of the dedicated image forming pixels in the neighborhood of that focus detection pixel. Accordingly, if an interpolation operation is performed based on information about the dedicated image forming pixels in the neighborhood of the focus detection pixel, there is a possibility that the images obtained by the neighboring pixels may be very different from output of an image forming pixel that originally should be located in the position of the focus detection pixel. Moreover, disposing the focus detection pixels densely imposes a limitation on neighboring image forming pixel options that can be referred to in performing an interpolation operation, and thus makes it highly probable that the correction error will increase.

SUMMARY OF THE INVENTION

The present invention has been made in view of the above-described problems, and achieves both high-precision focus detection performance and high image quality in the case of performing focus detection by disposing focus detection pixels on an image sensor for sensing an object image.

An image capturing apparatus according to the present invention includes an image sensor having a focus detection pixel group including a plurality of focus detection pixels that receive light passing through a part of a pupil area of an imaging lens for forming an object image and an image forming pixel group including a plurality of image forming pixels that receive light passing through the whole of the pupil area of the imaging lens; and an image processing unit that generates an image signal corresponding to the position of each of the focus detection pixels by using at least either of a signal of the focus detection pixel at the position and signals of neighboring image forming pixels of the focus detection pixel at the position, depending on the size of an aperture of the focus detection pixels.

Further features of the present invention will become apparent from the following description of an exemplary embodiment with reference to the attached drawings.

BRIEF DESCRIPTION OF THE DRAWINGS

FIGS. 6A and 6B are plan views of first focus detection pixels and second focus detection pixels, respectively.

FIGS. 9A and 9B are enlarged views of a focus detection area of the image sensor.

DESCRIPTION OF THE EMBODIMENTS

Figure 1:
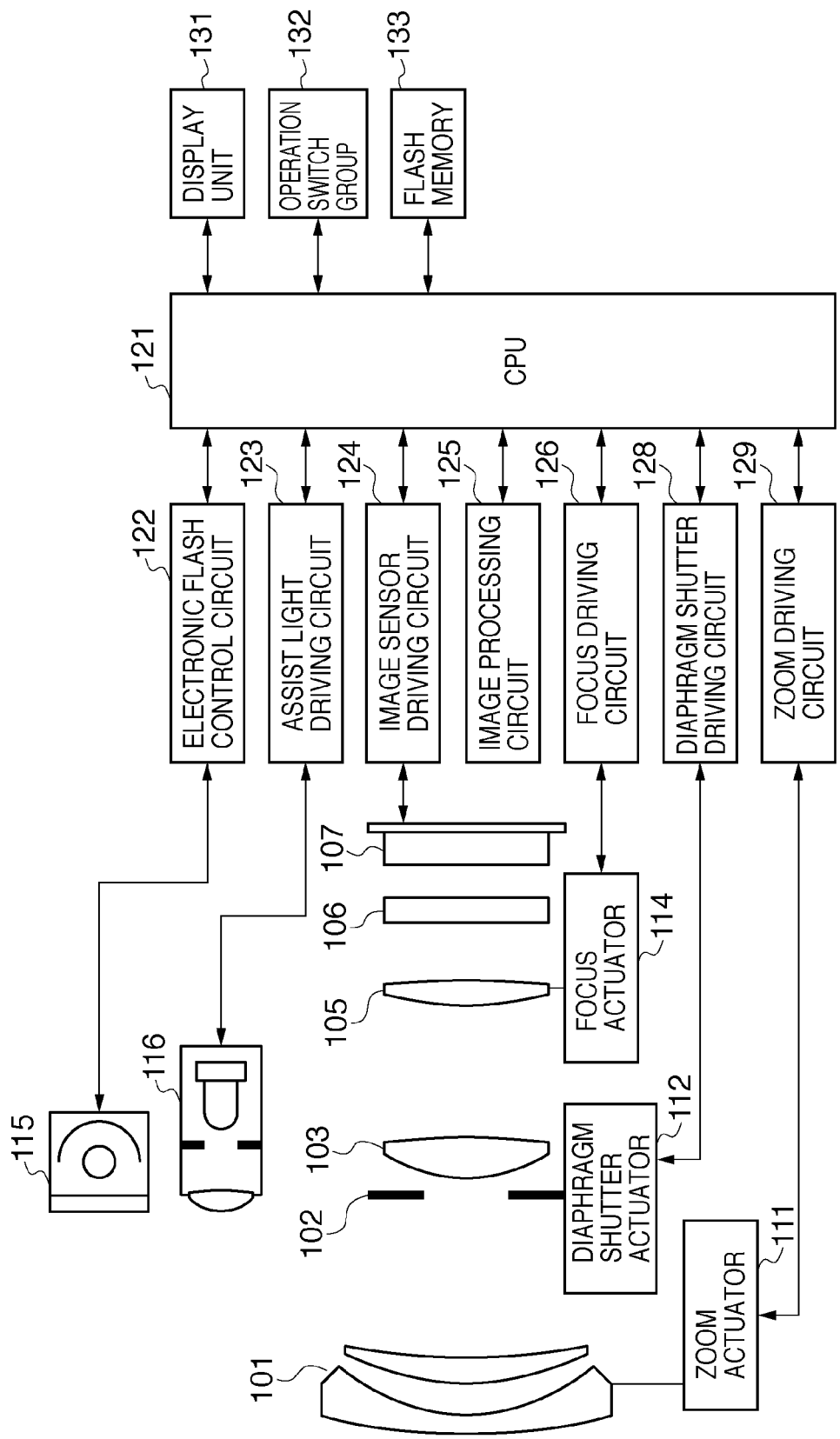
FIG. 1 is a diagram showing the configuration of an electronic camera according to an embodiment of the present invention.

FIG. 1 is a diagram showing the configuration of a camera according to an embodiment of the present invention and shows an electronic camera in which a camera main body including an image sensor and an imaging lens are integrated into a single unit. In FIG. 1, reference numeral 101 denotes a first lens group disposed at a front end of an imaging optical system (image forming optical system), held so as to be movable forward and backward in an optical axis direction. Reference numeral 102 denotes a diaphragm shutter, which adjusts the amount of light during shooting by controlling the aperture diameter thereof and also has the function of a shutter for controlling the exposure time during shooting of a still image. Reference numeral 103 denotes a second lens group. The diaphragm shutter 102 and the second lens group 103 move together forward and backward in the optical axis direction, and by moving in conjunction with forward and backward movement of the first lens group 101, provide an effect of varying the magnification (a zoom function).

Reference numeral 105 denotes a third lens group, which performs focus adjustment by moving forward and backward in the optical axis direction. Reference numeral 106 denotes an optical low-pass filter, which is an optical element for reducing false colors and moiré of a captured image. Reference numeral 107 denotes an image sensor configured of a C-MOS sensor and its peripheral circuitry. A two-dimensional single-chip color sensor in which an on-chip Bayer pattern primary color mosaic filter is formed over light-receiving pixels that are disposed in an array of m pixels in a lateral direction and n pixels in a longitudinal direction is used as the image sensor 107.

Reference numeral 111 denotes a zoom actuator, which rotates a cam barrel (not shown) to drive the first lens group 101 to the third lens group 105 forward and backward in the optical axis direction, thereby performing a magnification varying operation. Reference numeral 112 denotes a diaphragm shutter actuator, which controls the aperture diameter of the diaphragm shutter 102 to adjust the amount of light during shooting and also controls the exposure time during shooting of a still image. Reference numeral 114 denotes a focus actuator, which drives the third lens group 105 forward and backward in the optical axis direction, thereby performing focus adjustment.

Reference numeral 115 denotes an electronic flash for illuminating an object during shooting, and a flash illumination device that uses a xenon tube is preferable; however, an illumination device provided with an LED that continuously emits light may also be used. Reference numeral 116 denotes an AF assist light device, which projects an image of a mask having a predetermined aperture pattern onto an object field through a light projecting lens to improve focus detection capability with respect to a dark object or a low-contrast object.

Reference numeral 121 denotes a CPU (a camera control unit), which conducts various types of control of the camera main body and has an arithmetic unit, a ROM, a RAM, an A/D converter, a D/A converter, a communication interface circuit, and the like. The CPU 121 drives various circuits provided in the camera based on a predetermined program stored in the ROM to execute a series of operations such as AF, shooting, image processing, and recording.

Reference numeral 122 denotes an electronic flash control circuit, which controls lighting of the electronic flash 115 in synchronization with a shooting operation. Reference numeral 123 denotes an assist light driving circuit, which controls lighting of the AF assist light device 116 in synchronization with a focus detection operation. Reference numeral 124 denotes an image sensor driving circuit, which controls an image sensing operation of the image sensor 107, and performs A/D conversion on an obtained image signal and transmits the converted image signal to the CPU 121. Reference numeral 125 denotes an image processing circuit, which performs processing, such as gamma conversion, color interpolation, and JPEG compression, of an image obtained by the image sensor 107.

Reference numeral 126 denotes a focus driving circuit, which controls driving of the focus actuator 114 based on the result of focus detection to drive the third lens group 105 forward and backward in the optical axis direction, thereby performing focus adjustment. Reference numeral 128 denotes a diaphragm shutter driving circuit, which controls driving of the diaphragm shutter actuator 112 to control the aperture of the diaphragm shutter 102. Reference numeral 129 denotes a zoom driving circuit, which drives the zoom actuator 111 in accordance with a zoom operation by a photographer.

Reference numeral 131 denotes a display, such as an LCD, which displays information about a shooting mode of the camera, a preview image, which is displayed before shooting, and an image for review, which is displayed after shooting, an in-focus status display image during focus detection, and the like. Reference numeral 132 denotes an operation switch group, which includes a power switch, a release (shooting trigger) switch, a zoom operation switch, a shooting mode selection switch, and the like. Reference numeral 133 denotes a detachable flash memory, which records images that have been captured.

Figure 2:
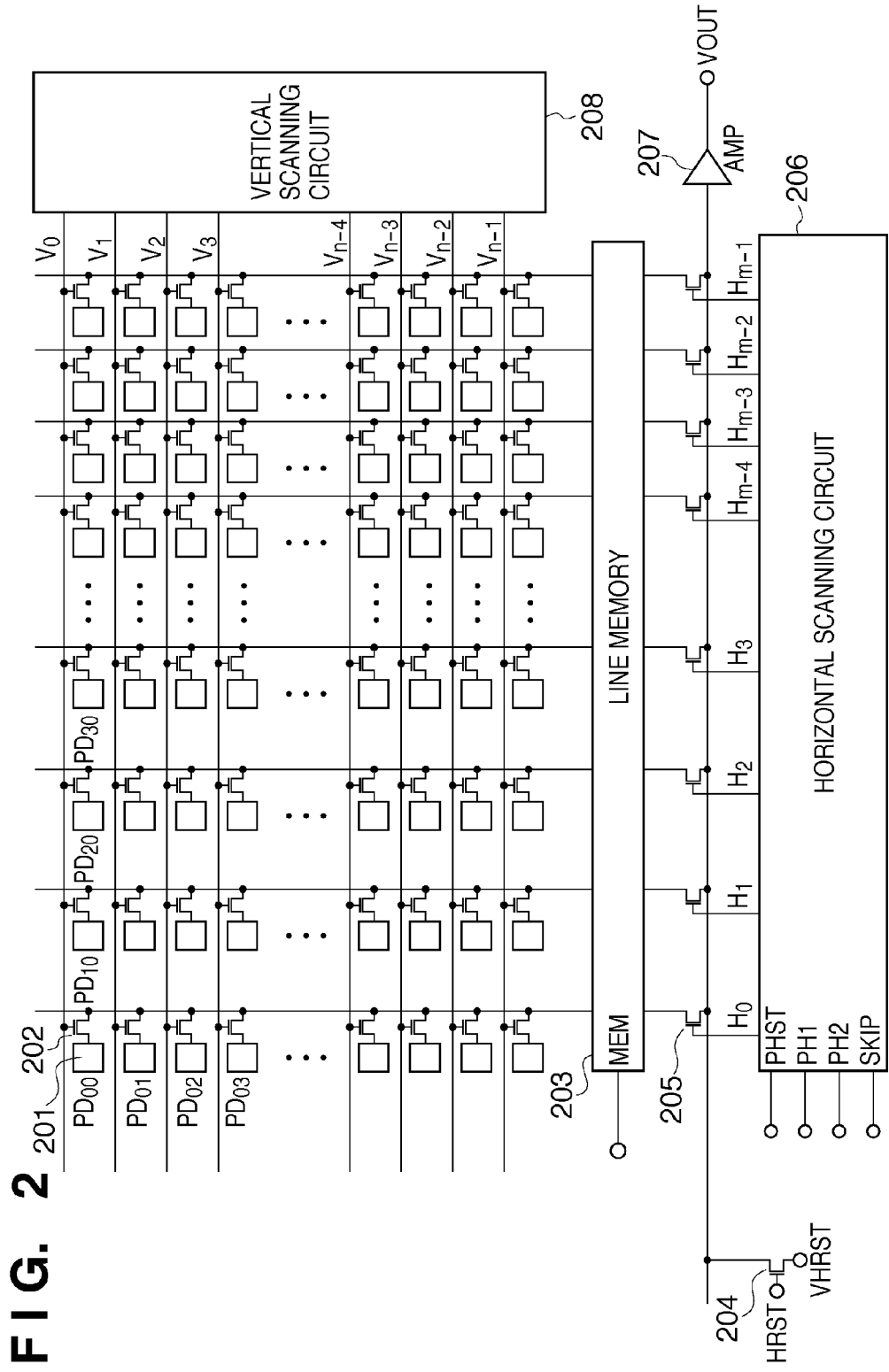
FIG. 2 is a block diagram of an image sensor of the embodiment of the present invention.

FIG. 2 is a block diagram of the image sensor. It should be noted that the block diagram in FIG. 2 shows the minimum configuration necessary for description of a readout operation, and a pixel reset signal and the like are omitted. In FIG. 2, reference numeral 201 denotes a photoelectric conversion unit, which is configured of a photodiode, a pixel amplifier, a reset switch, and the like. It should be noted that hereinafter the photoelectric conversion unit 201 will be abbreviated as PDmn, where m is an address in an X direction of two-dimensionally arrayed photoelectric conversion units and m=0, 1, ..., m−1, and n is an address in a Y direction and n=0, 1, ..., n−1. The image sensor of the present embodiment has m×n photoelectric conversion units that are arranged two-dimensionally. Reference numerals are attached only to the top left photoelectric conversion unit PD00 and the photoelectric conversion units in the vicinity thereof in order to simplify the diagram.

Reference numeral 202 denotes a switch for selecting output of a photoelectric conversion unit PDmn, and the selection is performed on a line-by-line basis by a vertical scanning circuit 208. Reference numeral 203 denotes a line memory for temporarily storing the output of the photoelectric conversion unit PDmn (201), and this line memory stores the output of each and every photoelectric conversion unit in a single line selected by the vertical scanning circuit 208. Usually, a capacitor is used. Reference numeral 204 denotes a switch that is connected to a horizontal output line and used to reset the horizontal output line to a predetermined electric potential VHRST, and this switch is controlled by a signal HRST.

Reference numeral 205 denotes individual switches for sequentially outputting the output of the photoelectric conversion units PDmn stored in the above-described line memory 203 to the horizontal output line. The output of each and every photoelectric conversion unit in a single line is read out by a horizontal scanning circuit 206 (described later) sequentially scanning the switches of H0 to Hm−1.

The horizontal scanning circuit 206 sequentially scans and outputs the output of the photoelectric conversion units PDmn stored in the line memory to the horizontal output line. A signal PHST is a data input of the horizontal scanning circuit, PH1 and PH2 are shift clock inputs, and a configuration is adopted in which data is set when PH1=H and data is latched at PH2. By inputting shift clocks to PH1 and PH2, it is possible to sequentially shift PHST to sequentially turn on the switches of H0 to Hm−1. SKIP is a control terminal input for performing settings during decimation readout. Setting the SKIP terminal to an H level allows the horizontal scanning circuit 206 to skip at a predetermined interval. Reference numeral 207 denotes an output amplifier.

The vertical scanning circuit 208 can select the selection switches 202 of the photoelectric conversion units PDmn by sequentially scanning and outputting V0 to Vn−1. Regarding control signals, the vertical scanning circuit 208 is controlled by a data input PVST, shift clocks PV1 and PV2, and SKIP for decimation readout settings in a similar manner to the horizontal scanning circuit 206. The operation of the vertical scanning circuit 208 is the same as that of the horizontal scanning circuit, and thus a detailed description thereof is omitted. Moreover, in FIG. 2, the control signals of the vertical scanning circuit 208 are not shown.

FIGS. 3A and 3B, FIGS. 4A and 4B, and FIGS. 7A and 7B are diagrams for explaining the structures of image forming pixels and focus detection pixels. A Bayer array having three types of pixels among a block of four pixels arranged in 2 rows×2 columns, namely pixels having spectral sensitivity to G (green) disposed as two diagonally opposed pixels, a pixel having spectral sensitivity to R (red) disposed as another pixel, and a pixel having spectral sensitivity to B (blue) disposed as another pixel, is employed to describe the present embodiment. Focus detection pixels having a structure that will be described later are disposed within this Bayer array in a distributed manner in conformity with a predetermined rule.

Figures 3A, 3B:
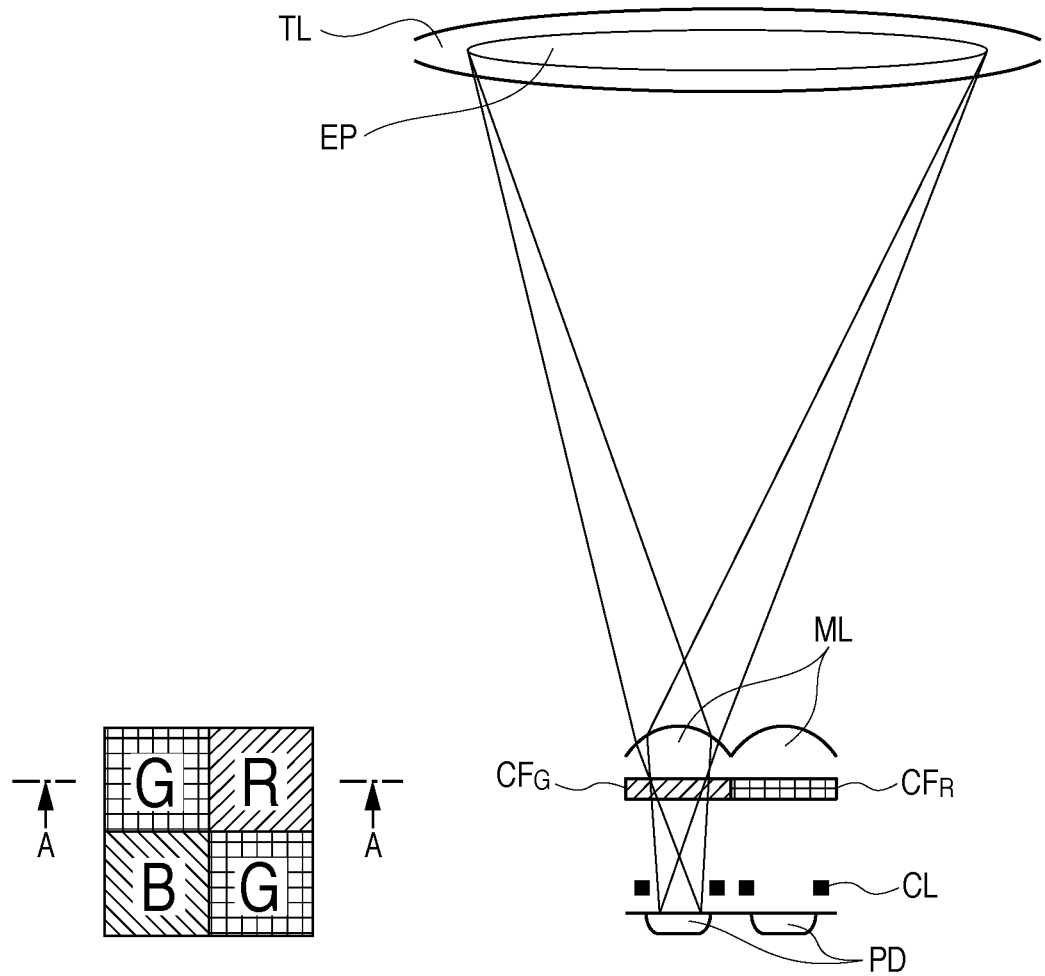
FIGS. 3A and 3B are a plan view and a cross-sectional view, respectively, of image forming pixels of the image sensor.

FIGS. 3A and 3B show an arrangement and structure of image forming pixels (an image forming pixel group). FIG. 3A is a plan view of 2×2 image forming pixels. FIG. 3B shows a cross section taken along line A-A of FIG. 3A. ML indicates an on-chip microlens disposed on the front surface of each pixel, CFR indicates an R (red) color filter, and CFG indicates a G (green) color filter. PD indicates a photoelectric conversion unit of the C-MOS sensor described using FIG. 2, shown schematically, and CL indicates a wiring layer for forming signal lines for transmitting various signals within the C-MOS sensor. TL indicates the imaging optical system, shown schematically.

Here, the on-chip microlens ML and the photoelectric conversion unit PD of the image forming pixel are configured so as to take in light beams passing through the imaging optical system TL as effectively as possible. In other words, an exit pupil EP of the imaging optical system TL and the photoelectric conversion unit PD are conjugate to each other due to the microlens ML, and also the photoelectric conversion unit is designed so as to have a large effective area. Moreover, although light beams incident on the G pixel are described in FIG. 3B, the R pixel and the B (blue) pixel also have the same structure. Therefore, the exit pupil EP corresponding to each of the R, G, and B image forming pixels has a large diameter, and efficiently takes in light beams from the object and thus improves the S/N of image signals.

Figures 4A, 4B:
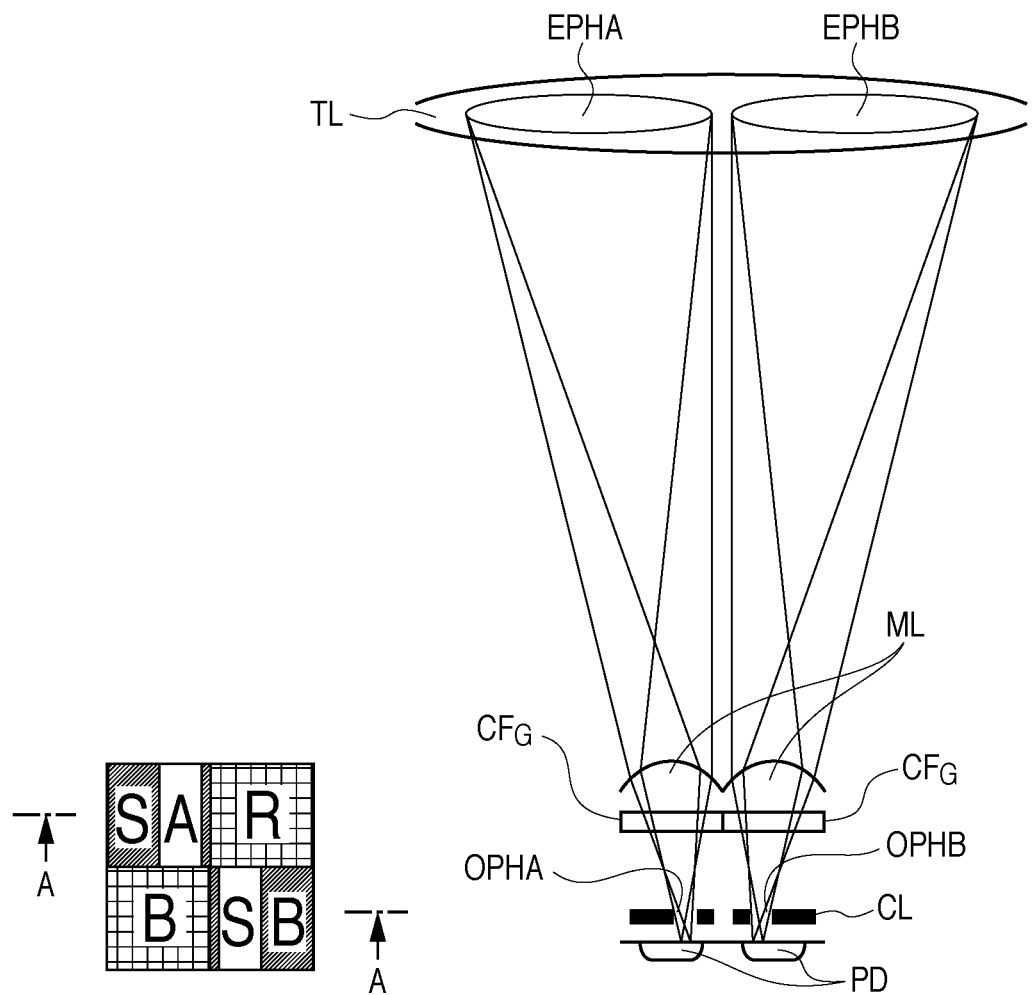
FIGS. 4A and 4B are a plan view and a cross-sectional view, respectively, of focus detection pixels for performing pupil division in a lateral direction of the image sensor.

FIGS. 4A and 4B show the structure of focus detection pixels for performing pupil division (dividing the whole pupil area into two) in a horizontal direction (lateral direction) of the imaging optical system. Here, by definition, the horizontal direction or lateral direction refers to a direction along a straight line that is perpendicular to an optical axis of the imaging optical system and that extends in the horizontal direction when the camera is held in such a manner that the optical axis of the imaging optical system is in a horizontal position. FIG. 4B shows a cross section taken along line A-A of FIG. 4A. The microlens ML and the photoelectric conversion unit PD have the same structures as those of the image forming pixels shown in FIG. 3B. Moreover, in order to perform pupil division on the image sensor, an aperture portion of the wiring layer CL is shifted in one direction with respect to a center line of the microlens ML. Specifically, an aperture portion OPHA of a pixel SA is shifted to the right, and accordingly the pixel SA receives light beams passing through an exit pupil EPHA on the left side of the imaging optical system TL. Similarly, an aperture portion OPHB of a pixel SB is shifted to the left, and accordingly the pixel SB receives light beams passing through an exit pupil EPHB on the right side of the imaging optical system TL. Therefore, assuming that the pixels SA are regularly arrayed in the horizontal direction and an object image obtained by this pixel group is referred to as an image A, and that the pixels SB also are regularly arrayed in the horizontal direction and an object image obtained by this pixel group is referred to as an image B, an amount by which the object image is out of focus (a defocus amount) can be detected by detecting the relative positions of the images A and B.

Figure 5A:
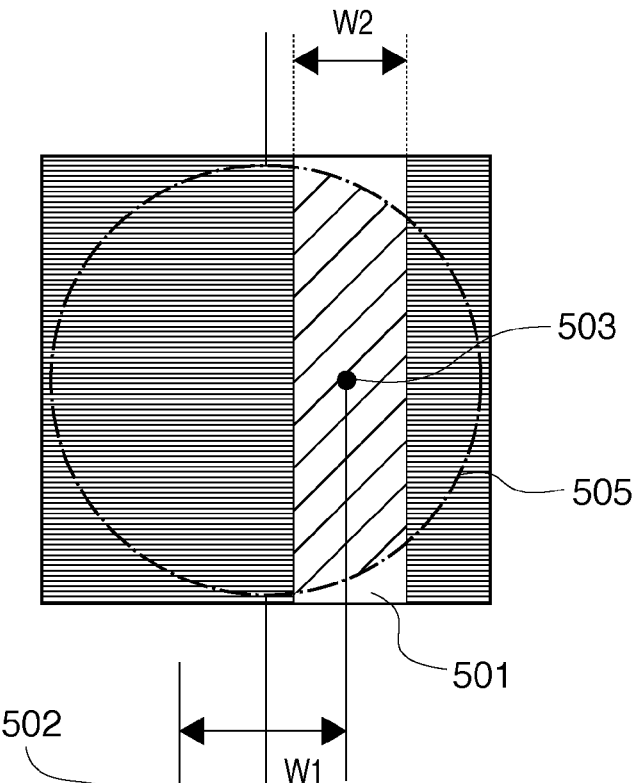
FIGS. 5A and 5B are diagrams showing the relationship between a pair of pixel apertures of focus detection pixels and focus detection performance.
Figure 5B:
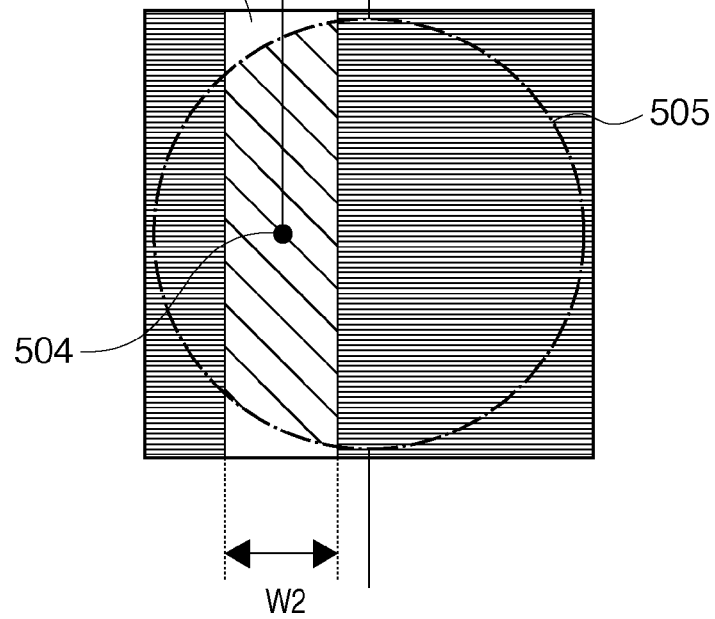

FIGS. 5A and 5B are diagrams for explaining the relationship between focus detection performance and pixel aperture portions for restricting light beams passing through the exit pupil of the imaging optical system, of a pair of focus detection pixels that has been subjected to pupil division. In FIGS. 5A and 5B, reference numerals 501 and 502 denote pixel aperture portions of a pair of focus detection pixels, the pixel aperture portions being positioned eccentrically with respect to the center of optical axes of the pixels in opposite directions to each other, and areas indicated by dashed circles 505 show the position of the pupil on image forming pixels and diagonally hatched portions show distance measuring pupils on the focus detection pixels. Moreover, a point 503 and a point 504 show the position of the center of gravity of the distance measuring pupils on the focus detection pixels, and as a distance W1 between the points 503 and 504 in the horizontal direction increases, the amount of image shift at the same defocus amount increases, and accordingly the precision of focus detection improves. Furthermore, W2 indicates the width of each distance measuring pupil in a direction in which distance measuring pupils are arranged in a row, and as W2 increases, the amount of blurring of an image received by the focus detection pixel group in a defocus condition increases. Conversely, as W2 decreases, the amount of image blurring decreases even in a large defocus condition, and it is thus possible to perform image shift detection using a high-contrast image.

FIG. 6A is a plan view of 2 rows×2 columns of pixels including first focus detection pixels. In the present embodiment, the first focus detection pixels of a first focus detection pixel group are disposed densely (with a small array pitch) within a focus detection area in order to perform focus adjustment with high precision in the vicinity of an in-focus position. Since the first focus detection pixels are disposed densely (in FIG. 9, the image detection pitch is 2 pixels), if an image signal corresponding to the position of a focus detection pixel is generated from image signals of image forming pixels in the neighborhood of that pixel by interpolation processing, there is a possibility that a correction mark may be conspicuous depending on the object. To address this issue, in the case where focus detection pixels are disposed densely as in the first focus detection pixel group, image information at the position of each focus detection pixel is generated by performing gain correction processing on a signal of that focus detection pixel. In order to use a signal of a focus detection pixel to generate image information, it is desired that the S/N ratio of the signal of the focus detection pixel also be high. Moreover, since the image information is generated based on the signal of the focus detection pixel, it is not desirable that sensitivity characteristics with respect to color of the focus detection pixel differ from those of an image forming pixel that originally should be located in the position of that focus detection pixel. Thus, the first focus detection pixels are designed such that the R and B pixels are left as image forming pixels whereas the G pixels are replaced by focus detection pixels and the focus detection pixels can receive more than half of light beams passing through the exit pupil (in FIGS. 7A and 7B, W2 is set at half of an image forming pixel). Such first focus detection pixels are indicated by SAH and SBH in FIG. 6A.

FIG. 6B is a plan view of 4 rows×2 columns of pixels including second focus detection pixels. In the present embodiment, W2 of a second focus detection pixel group is set at a small value since the second focus detection group performs focus adjustment in a relatively large defocus condition. Moreover, the second focus detection pixels are disposed sparsely (in FIGS. 9A and 9B, the image detection pitch is 12 pixels) because images received in a large defocus condition are blurry and thus it is not necessary to finely detect an image. Sparsely disposing focus detection pixels increases the number of pixel options that can be referred to in generating image information at the positions of the focus detection pixels by an interpolation operation, and consequently, the interpolation accuracy can be improved. Besides, the sparse arrangement makes slight correction marks on captured images inconspicuous. Furthermore, as a result of disposing the second focus detection pixels constituting the second focus detection pixel group in the positions of the R and B pixels of the Bayer array while leaving the G pixels as image forming pixels, the correction marks become even less conspicuous. In the case of obtaining an image sensing signal, the G pixels provide a main component of luminance information. Among human image recognition characteristics, humans are sensitive to luminance information, so that once a G pixel has been lost, image quality degradation is likely to be perceived. The R or B pixel is a pixel for obtaining color information. However, humans are insensitive to color information and are thus unlikely to notice image quality degradation even when a slight loss of the pixels for obtaining color information has occurred. In FIG. 6B, the second focus detection pixels are indicated by SAS and SBS. It should be noted that in the present embodiment, since signals of the second focus detection pixels are not used for image generation, the R or B color filters for color separation may be replaced by G filters or transparent films CFW (white).

It should be noted that in FIGS. 6A and 6B, focus detection with respect to an object, for example, a vertical line, having a luminance distribution in the lateral direction of an image capturing screen is possible, whereas focus detection with respect to a horizontal line having a luminance distribution in a longitudinal direction is impossible. When it is desired to detect the out-of-focus amount in the longitudinal direction, a configuration can be adopted in which SA and its aperture portion OPHA are shifted to the top side and SB and its aperture portion OPHB are shifted to the bottom side.

Figures 7A, 7B:
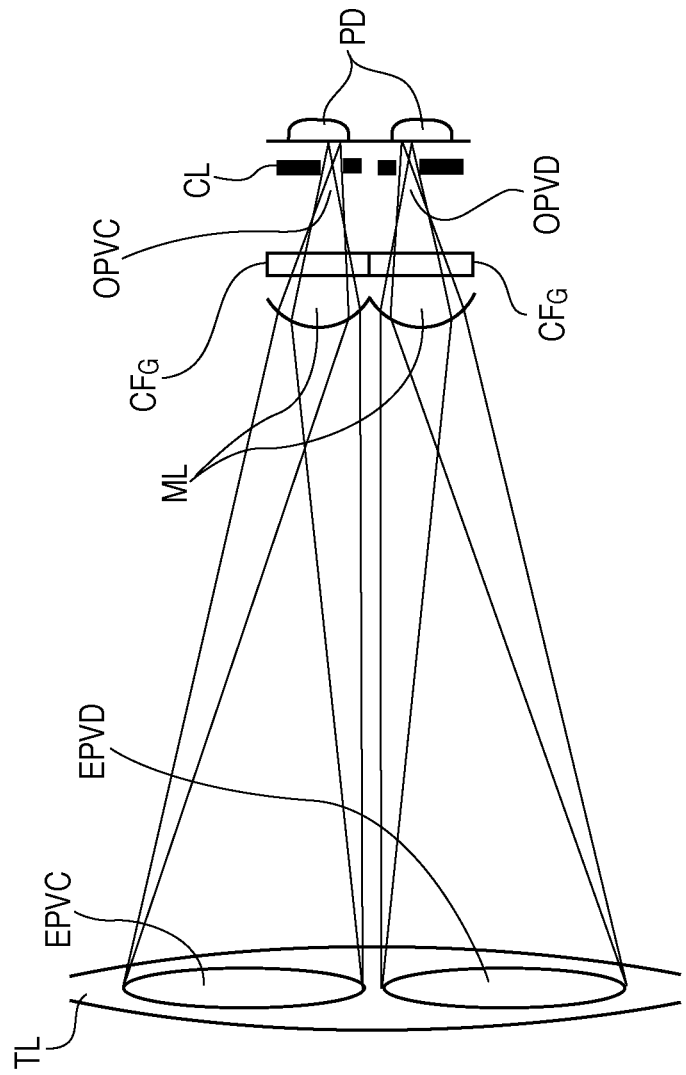
FIGS. 7A and 7B are a plan view and a cross-sectional view, respectively, of focus detection pixels for performing pupil division in a longitudinal direction of the image sensor.

FIGS. 7A and 7B show an arrangement and structure of focus detection pixels for performing pupil division in the longitudinal direction of the imaging optical system. Here, by definition, the longitudinal direction refers to a direction along a straight line that is perpendicular to the optical axis of the imaging optical system and that extends in the vertical direction when the camera is held in such a manner that the optical axis of the imaging optical system is in a horizontal position. FIG. 7A is a plan view of 2 rows×2 columns of pixels including focus detection pixels, and similarly to FIG. 4A, R and B pixels are left as image forming pixels and G pixels are replaced by focus detection pixels. In FIG. 7A, such focus detection pixels are indicated by SC and SD.

FIG. 7B shows a cross section taken along line A-A of FIG. 7A. The pixels in FIG. 4B are configured to divide the pupil in the lateral direction, whereas the pupil division direction of the pixels in FIG. 7B is the longitudinal direction, and otherwise there is no difference in pixel structure between FIGS. 4B and 7B. That is to say, an aperture portion OPVC of the pixel SC is shifted to the bottom side, and accordingly the pixel SC receives light beams passing through an upper exit pupil EPVC of the imaging optical system TL. Similarly, an aperture portion OPVD of the pixel SD is shifted to the top side, and accordingly the pixel SD receives light beams passing through a lower exit pupil EPVD of the imaging optical system TL. Therefore, assuming that the pixels SC are regularly arrayed in the vertical direction and an object image obtained by this pixel group is referred to as an image C, and that the pixels SD also are regularly arrayed in the vertical direction and an object image obtained by this pixel group is referred to as an image D, the out-of-focus amount (defocus amount) of an object image having a luminance distribution in the vertical direction can be detected by detecting the relative positions of the images C and D.

Figure 8:
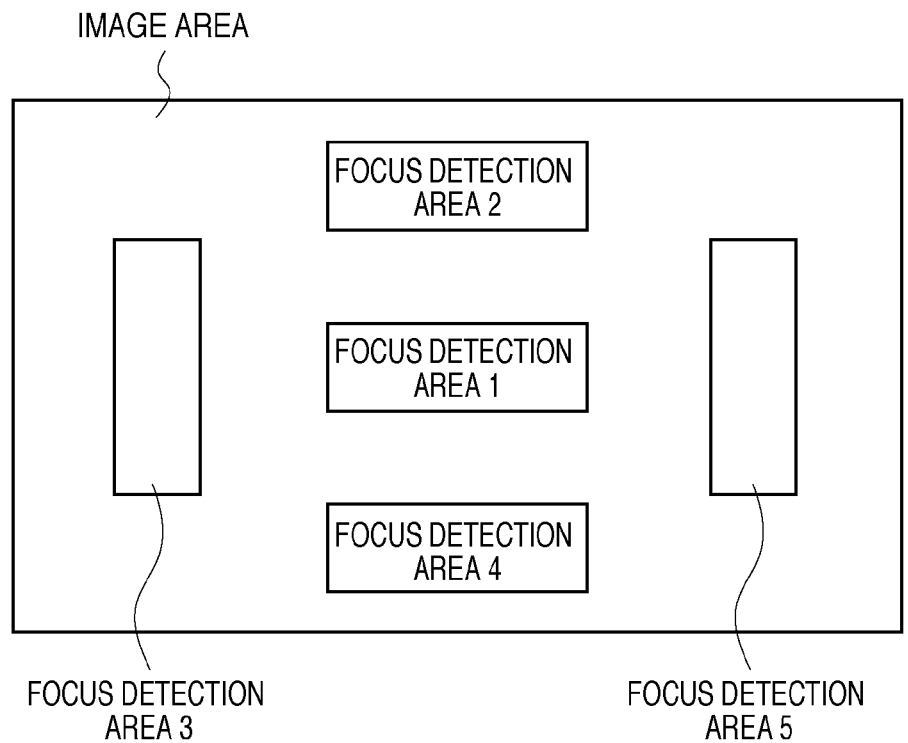
FIG. 8 is a diagram showing focus detection areas on the image sensor.

FIG. 8 is a diagram showing the relationship between an image area and focus detection areas on an image sensing screen. A plurality of focus detection areas 1 to 5 are set on the image sensing screen, and focus detection pixels are arrayed corresponding to the focus detection areas 1 to 5 on the image sensing screen. That is to say, the focus detection pixel group on the image sensor performs focus detection by sampling images from object images that have been formed in areas corresponding to the focus detection areas 1 to 5. The first focus detection pixel group for high-precision focus detection in the vicinity of the in-focus position and the second focus detection pixel group for large defocus detection are disposed in each individual focus detection area.

Figure 9A:
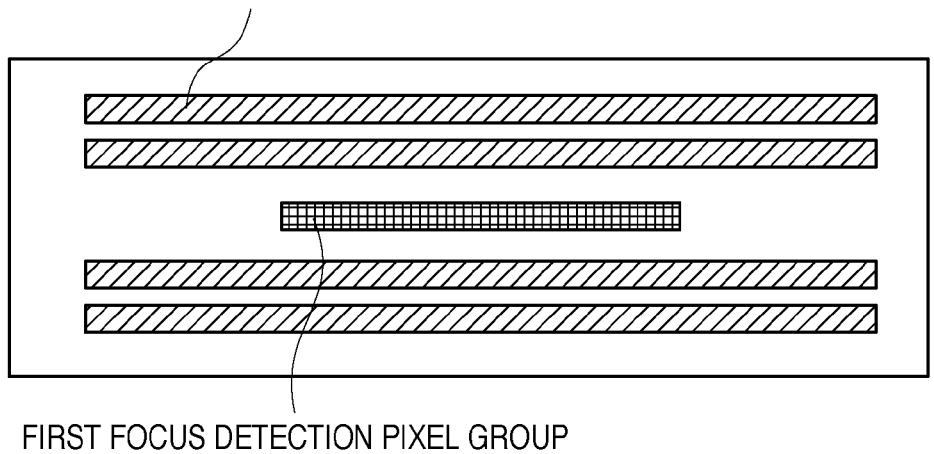

FIG. 9A is a diagram showing an arrangement of focus detection pixel groups by enlarging a part of one focus detection area, and FIG. 9B is a diagram showing an arrangement of image forming pixels and focus detection pixels. In FIG. 9B, SAH and SBH indicate focus detection pixels constituting a first focus detection pixel group, which are pixels for focus detection formed by shifting apertures of pixel units toward opposite directions to each other in the horizontal direction, and are used to detect the image shift amount in the horizontal direction. Hollow portions of SAH and SBH indicate the shifted aperture position of the pixels. SAS and SBS in FIG. 9B indicate focus detection pixels constituting a second focus detection pixel group, which are pixels for focus detection formed by shifting apertures of pixel units toward opposite directions to each other in the horizontal direction, and are used to detect the image shift amount in the horizontal direction. Hollow portions of SAS and SBS also indicate the shifted aperture position of the pixels. In the present embodiment, as shown in FIG. 9A, there is a difference in arrangement density in a direction perpendicular to the direction in which pupils are arranged in a row between the first focus detection pixel group and the second focus detection pixel group. With respect to the first focus detection pixel group, more second focus detection pixel groups are disposed. The reason for this is that since the pixel aperture width W2 of the second focus detection pixels is narrower than that of the first focus detection pixels, the S/N of the second focus detection pixels is low, which may cause difficulty in detecting the image shift amount with respect to a low-luminance object. Thus, a plurality of lines of second focus detection pixel groups are disposed, and signals of the plurality of lines are averaged to improve the S/N, thereby enabling accurate focus adjustment. Moreover, a method may also be adopted in which a highly reliable result is selected from among a plurality of image shift amounts respectively calculated in the plurality of lines and is used for focus adjustment.

Figure 10:
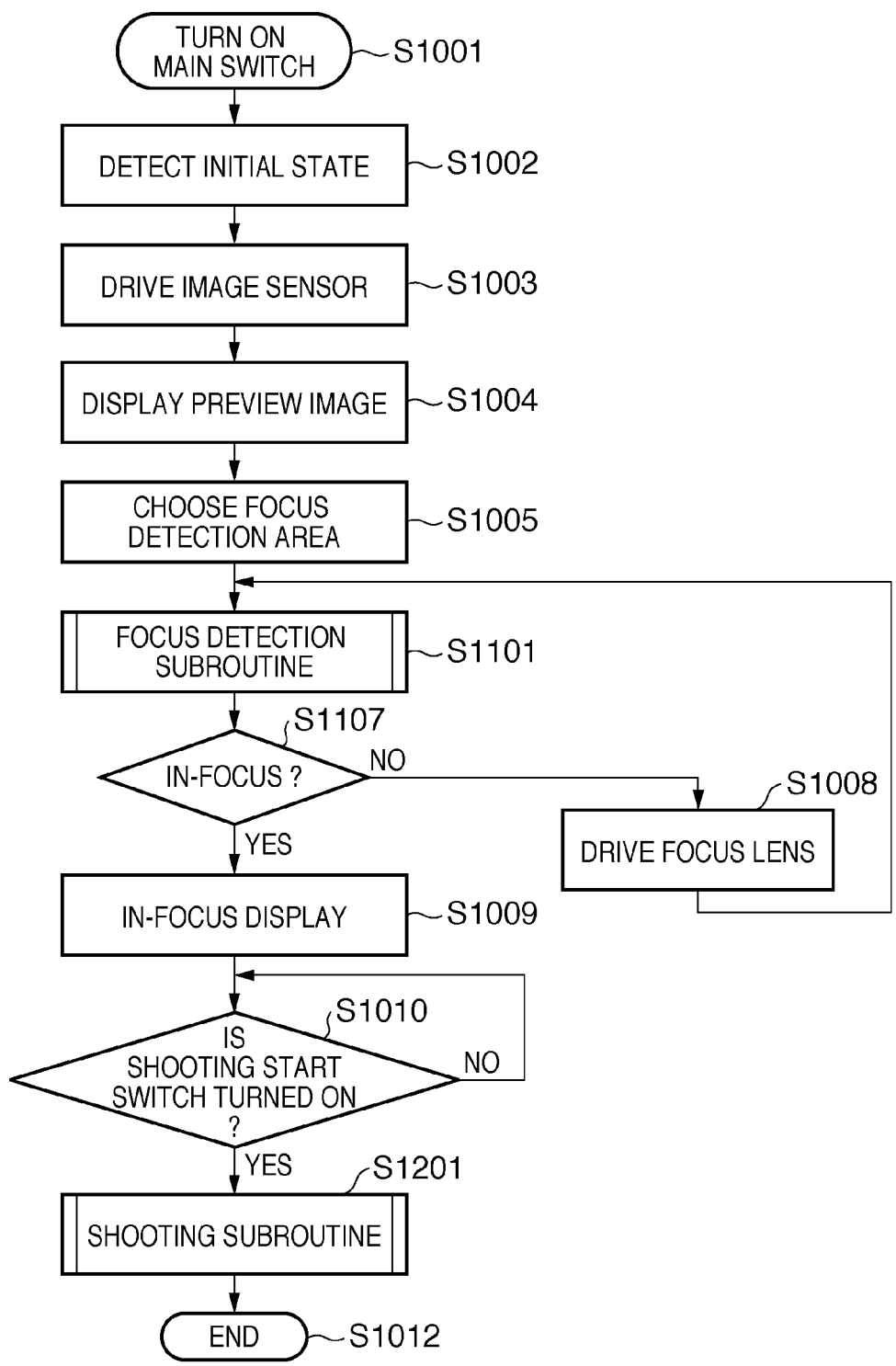
FIG. 10 is a flowchart showing the operation of the electronic camera of the embodiment.

FIG. 10 is a flowchart showing the operation of the electronic camera of the present embodiment. If the photographer turns on the power switch of the camera, then, in step S1002, the CPU 121 tests the operation of the various actuators and the image sensor within the camera, initializes memory contents and executable programs, and executes a preparatory operation for shooting. In step S1003, the image sensing operation of the image sensor is started, and a low-pixel moving image for preview is output. In step S1004, the moving image that has been read out is displayed on the display 131 provided in the rear face of the camera, and the photographer visually observes this preview image to determine the composition during shooting. In step S1005, a focus detection area is chosen from within the image area in FIG. 8. After that, the operation is advanced to step S1101, and a focus detection subroutine is executed.

Figure 11:
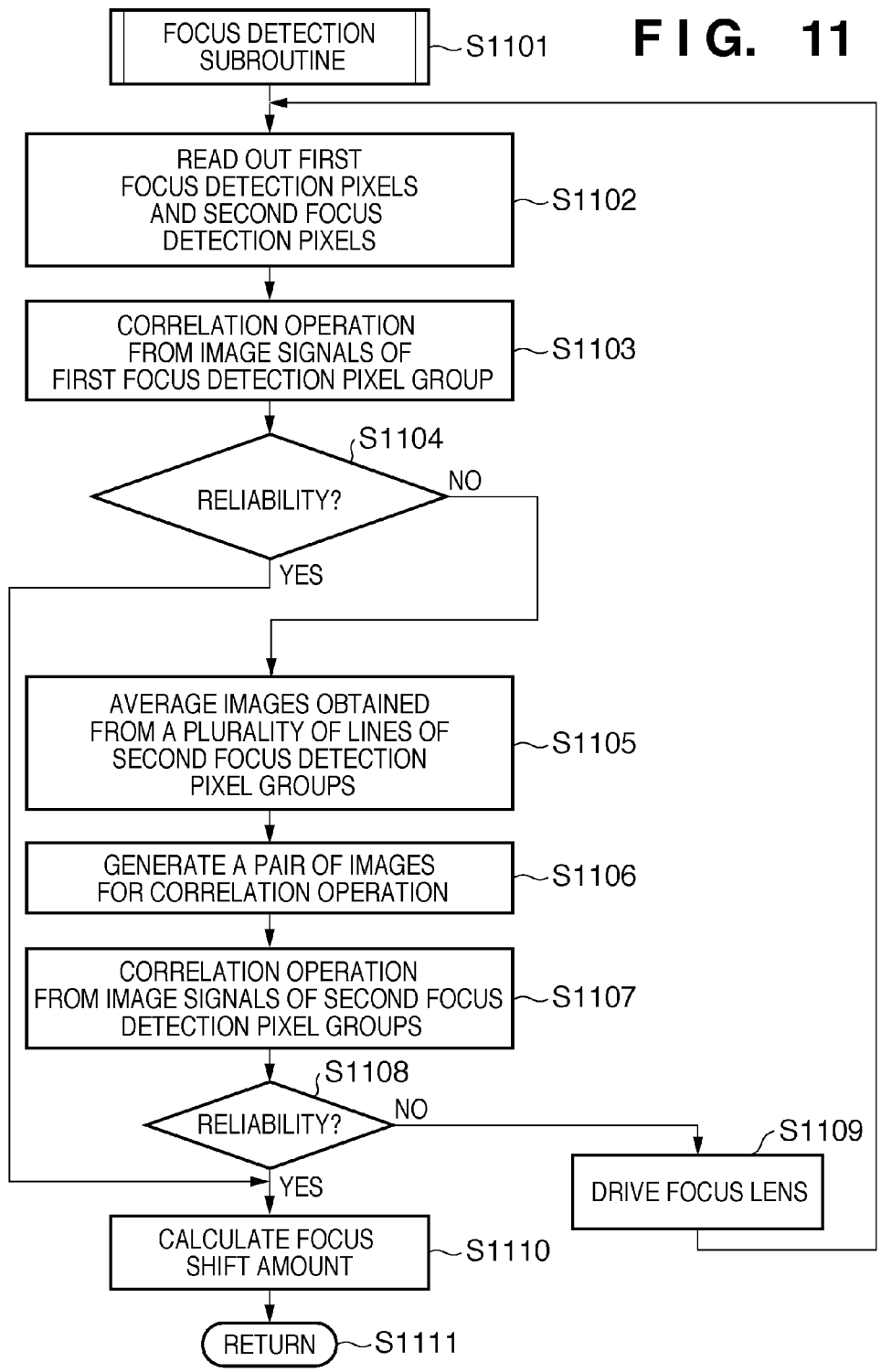
FIG. 11 is a flowchart showing a focus detection operation of the electronic camera of the embodiment.

FIG. 11 is a flowchart of step S1101, which is the focus detection subroutine. Once the operation jumps from step S1005 of the main flow to step S1101 of this subroutine, in step S1102, output signals of a first focus detection pixel group and second focus detection pixel groups included in the focus detection area that has been chosen in step S1005 of the main flow are read out. In step S1103, based on a pair of image signals obtained from the first focus detection pixel group, a correlation operation between the two images is performed to calculate the amount of relative positional shift between the two images. In step S1104, the reliability of the result of the correlation operation is determined. Here, the reliability refers to the degree of matching between the two images, and at a high degree of matching between the two images, the reliability of the result of focus detection is generally high. If the reliability is within a predetermined range of values, it is determined that the reliability is high, and the operation is advanced to step S1110, in which the amount of focus shift is calculated from the detection result. Then, in step S1111, the operation returns to step S1007 in the main flow of FIG. 10. Moreover, in step S1104, in which the reliability of the correlation operation result is determined, if the reliability is outside the predetermined range of values, the operation is advanced to step S1105. In steps S1105 to S1107, a correlation operation is performed based on image signals obtained from the second focus detection pixel groups. In steps S1105 and S1106, in the second focus detection pixel groups that are disposed in a plurality of lines, output signals of the focus detection pixels located at the same position in the horizontal direction of the individual lines are averaged to generate a pair of image signals. In step S1107, a correlation operation between the obtained two images is performed to calculate the amount of relative positional shift between the two images. In step S1108, the reliability of the result of the correlation operation for the second focus detection pixel groups is determined. In the determination of the reliability of the correlation operation result in step S1108, if the reliability is within a predetermined range of values, the operation is advanced to step S1110, and if the reliability is outside the predetermined range of values, the operation is advanced to step S1109. In step S1109, the focus lens is driven, and afterward step S1101 is repeated.

In step S1007 of FIG. 10, it is determined whether or not the focus shift amount calculated in step S1110 of FIG. 11 is an acceptable value or less. If the focus shift amount is larger than the acceptable value, it is determined that proper focus is not achieved, so that the focus lens is driven in step S1008. After that, steps S1101 to S1007 are repeated. If it is determined in step S1007 that an in-focus state has been achieved, an in-focus display is performed in step S1009, and the operation proceeds to step S1010.

In step S1010, it is determined whether or not a shooting start switch is turned on, and if the switch is not yet turned on, a shooting standby state is maintained in step S1010. If the shooting start switch is turned on in step S1010, the operation proceeds to step S1201, and a shooting subroutine is executed.

Figure 12:
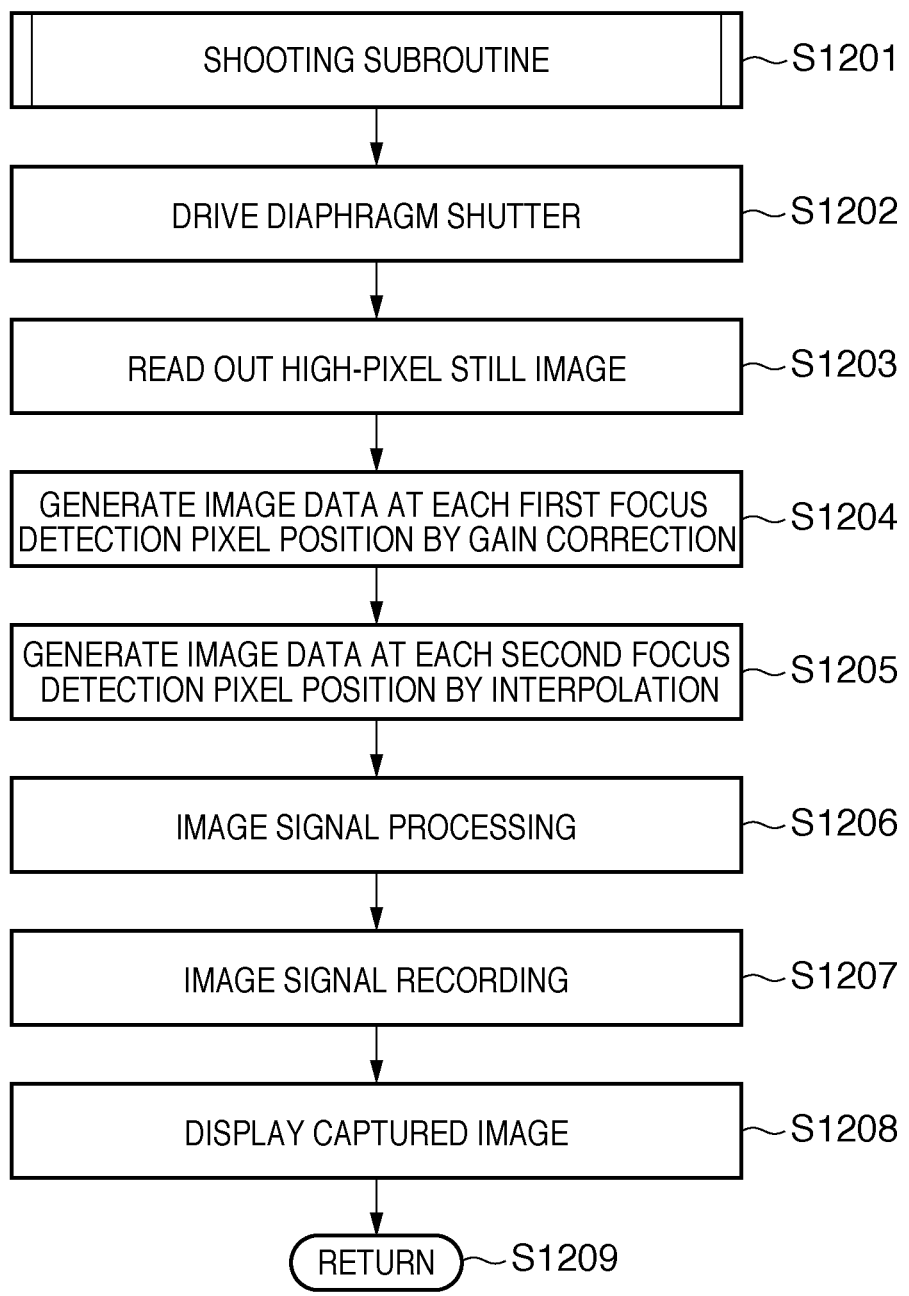
FIG. 12 is a flowchart showing a shooting operation of the electronic camera of the embodiment.

FIG. 12 is a flowchart of the shooting subroutine. If the shooting start switch is operated, the operation proceeds, via step S1201, to step S1202, in which the diaphragm shutter actuator 112 is driven to control the aperture of the diaphragm shutter 102 that defines the exposure time. In step S1203, image readout for shooting of a high-pixel still image, that is, readout of all the pixels is performed. In steps S1204 and S1205, image data at each focus detection pixel position is generated from image signals that have been read out. That is to say, in an area in which focus detection pixels are densely disposed like the first focus detection pixels, image data is generated from signals of the focus detection pixels by gain correction. Moreover, in an area in which focus detection pixels are sparsely disposed like the second focus detection pixels, image data is generated from information about neighboring image forming pixels by interpolation. Regarding gain correction values for the respective focus detection pixels, mathematical expressions that are calculable in accordance with the position of the pixels for each lens and for each diaphragm aperture size are stored within the camera in advance. Alternatively, the camera may have a gain adjustment unit that, each time an image is captured, obtains a gain correction value in real time based on the output of a focus detection pixel and the output of image forming pixels of the same color disposed in the neighborhood of the focus detection pixel.

The flowchart of the shooting operation shown in FIG. 12 illustrates an example in which, in the area where focus detection pixels are densely disposed, image data is generated from signals of the focus detection pixels by gain correction, and in the area where focus detection pixels are sparsely disposed, image data is generated from information about neighboring image forming pixels by interpolation. However, a method of individually weighting the operation results of gain correction and interpolation correction and generating image data by weighted summation may be adopted as the image data generating method. The same effects can be obtained by assigning higher priority to the results of gain correction in the case of the first focus detection pixels and assigning higher priority to the results of interpolation correction in the case of the second focus detection pixels.

In step S1206, image processing such as gamma correction and edge enhancement of an image is performed, and in step S1207, the captured image is recorded in the flash memory 133. In step S1208, the image that has been captured is displayed on the display 131, and in step S1209, the operation returns to the main flow of FIG. 10. Once the operation has returned to the main flow in FIG. 10, in step S1012, the shooting operation sequence is ended.

By performing operations as described above, both high-quality images and high-precision AF over a wide focus range can be achieved in both of the first focus detection pixel area and the second focus detection pixel area provided in the image sensor 107.

It should be noted that the above-described embodiment is just a typical example, and various modifications and alterations can be made to the present embodiment in carrying out the present invention.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-234645, filed Oct. 8, 2009, which is hereby incorporated by reference herein in its entirety.

What is claimed is:

1. An image capturing apparatus comprising:
   an image sensor having a focus detection pixel group including a plurality of focus detection pixels that receive light passing through a part of a pupil area of an imaging lens for forming an object image and an image forming pixel group including a plurality of image forming pixels that receive light passing through the whole of the pupil area of the imaging lens; and
   an image processing unit that performs a first image processing depending on a size of an aperture of the focus detection pixels and a second image processing depending on a different size of an aperture of the focus detection pixels, wherein in the first image processing, the image processing unit generates an image signal corresponding to a position of the focus detection pixels by using a signal of the focus detection pixel at the position, and wherein in the second image processing, the image processing unit generates an image signal corresponding to a position of the focus detection pixels by using signals of neighboring image forming pixels of the focus detection pixels at the position.

2. The image capturing apparatus according to claim 1, wherein the focus detection pixel group includes first focus detection pixels and second focus detection pixels, wherein an aperture of the first focus detection pixels is larger than an aperture of the second focus detection pixels, and wherein the image processing unit generates an image signal corresponding to a position of the first focus detection pixels by using a signal of a first focus detection pixel at the position, and the image processing unit generates an image signal corresponding to a position of the second focus detection pixels by using signals of neighboring image forming pixels of the second focus detection pixels at the position.

3. The image capturing apparatus according to claim 1, wherein the image processing unit generates an image signal corresponding to a position of the focus detection pixels by using a signal of the focus detection pixel at the position in the case where the size of the aperture of the focus detection pixel at the position is equal to or more than half a size of an aperture of the image forming pixels.

4. The image capturing apparatus according to claim 1, wherein the image sensor is configured of three types of pixels that are two-dimensionally arrayed and that respectively receive red, green, and blue light components, and focus detection pixels have an aperture of a size smaller than half a size of an aperture of the image forming pixels disposed in positions corresponding to the pixels that receive the red and blue light components.

5. The image capturing apparatus according to claim 1, wherein the focus detection pixel group has a plurality of first focus detection pixels having an aperture of a size equal to or more than half a size of an aperture of the image forming pixels and a plurality of second focus detection pixels having an aperture smaller than the aperture of the first focus detection pixels, and an array pitch of the plurality of first focus detection pixels is smaller than an array pitch of the plurality of second focus detection pixels.

* * * * *